Feb. 2, 1932.   E. F. BECHER   1,843,893
SEAT CUSHION
Filed May 18, 1931

Inventor
Ernest F. Becher
By Bean, Brooks & Henry.
Attorney

Patented Feb. 2, 1932

1,843,893

UNITED STATES PATENT OFFICE

ERNEST F. BECHER, OF BUFFALO, NEW YORK

SEAT CUSHION

Application filed May 18, 1931. Serial No. 538,340.

This invention relates to cushion seats and particularly to such seats as are adapted for use in motor vehicles.

Heretofore, the passenger compartments of vehicles have usually been provided with seat cushions which comprise a framework, including a plurality of vertical coiled springs, and padding and covering material superposed on the springs. It has been found that, after a period of use, the padding may become distorted and flattened so that the upper edges of the springs are disposed close to the cover, causing the cushion to be very uncomfortable to sit upon. Because of the uneven distribution of loads applied to such a cushion, certain of the springs may become permanently distorted, causing the surface of the cushion to be uneven. Other disadvantages are that, when excessive loads are applied to the cushion, as when the vehicle passes over a bump, the coil springs may be completely flexed until the convolutions thereof contact, so that the passenger, for the time being, is virtually sitting upon a seat of steel. Coil springs are very resilient and immediately following flexure may rebound violently tending to catapult the passenger from the seat.

Furthermore, with the spring seats, drivers of automobiles who are constantly "at the wheel" are subjected almost continuously to jarring incidental to road travel and this constant jarring as reproduced by the steel springs is rather accentuated when transmitted to the driver's body and frequently results in disabling him for duty and may sometimes cause what is frequently termed "athlete's back."

More recently, other cushion means have been proposed, which have eliminated the use of metal springs and have comprised resilient bodies, covered with usual covering material. Such cushions have been found to be unsatisfactory for use upon automotive equipment, largely because of the inability to provide rubber of sufficient density to comfortably support a passenger under the varying load conditions which are imposed upon it by movement of the vehicle. For example, when the vehicle is travelling over a smooth roadway, there is substantially no flexure required of the cushion body, and relatively light loads are applied to it by the vehicle and passenger, but, when the vehicle is passing over rough roads, heavy shocks may temporarily impose great loads upon the cushion. It has also been found that, if the cushion be of sufficient depth and density to adequately support the passenger, it will be relatively incompressible so that a very uncomfortable seat is provided, whereas, if the density and depth of the cushion be such that it is comfortable, it may be inadequate for supporting the passenger and will be so completely compressed by the passenger's weight as to be incapable of flexing sufficiently to smooth out shocks transmitted by the vehicle when the latter is passing over rough roadway.

The present invention comprehends an improved cushion seat, which, in a large measure obviates or overcomes these difficulties. It comprises a body portion of a rubber composition generally known as 'sponge rubber', or rubber having a multitude of small interconnected air cells extending homogeneously therethrough. The lower portion of the sponge rubber body is preferably formed of greater density than the upper part thereof, having a greater ratio of rubber volume to air volume in the lower than in the upper portions thereof. A suitable framework is provided for supporting the rubber body upon the vehicle and a suitable cover of leather or other upholstery material is superposed upon the upper surface and about the side edges of the body.

It has been found that, in the warm weather, the conventional vehicle seat cushion may become excessively heated, and, for this reason, uncomfortable. The present invention overcomes this by providing automatic cooling means for the seat cushion, openings being formed through the covering material to allow communication between the outside atmosphere and the air cells within the rubber body, in order that, upon flexure of the cushion, air may be expelled therefrom and new air may, upon reflexure of the cushion to a normal position, be drawn in from the atmosphere to effect a cooling of the cushion.

These and other objects and advantages will become apparent from the following description of one typical embodiment of the invention, reference being made to the accompanying drawings wherein.

Figure 2:
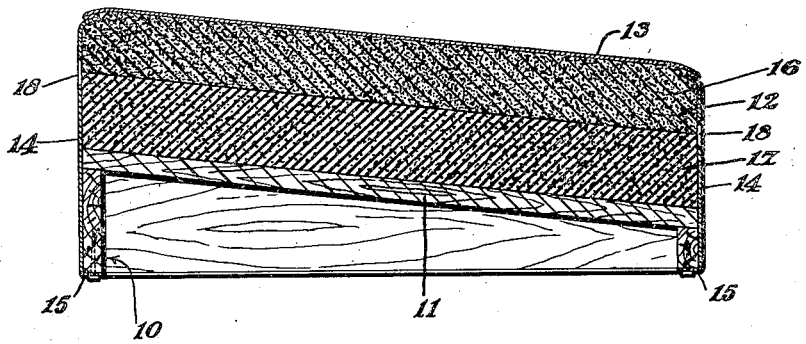
Fig. 2 is a vertical cross section through the cushion of Fig. 1.

As shown, the cushion comprises a framework 10, having a substantially horizontal web portion 11, upon which the rubber body 12, is supported, covering material 13 being superposed on the body 12, and extending downwardly about the sides thereof, as indicated 14, being secured at its lower edges 15 to the framework 10. As shown in Figure 2, the cushion 12 may comprise upper and lower layers, 16 and 17 respectively, which may be secured together in any suitable manner, such as by vulcanizing or by a rubber cement. The upper layer 16 is preferably of comparatively light density, the air cells therein having a relatively large volume as compared with the rubber volume, while the lower layer 17 has air cells of relatively small volume as compared with the rubber volume.

The rubber over the air cells in the upper layer forms relatively weak arches so that the weight of a passenger will cause the rubber to be temporarily flexed and to conform to the contour of the passenger's anatomy, thereby providing a comfortable and soft cushioned surface. In the lower layer 17, the arches are substantially stronger and will, under normal load imposed by the passenger's weight, flex only slightly, thereby providing an adequate support and leaving the rubber in condition for greater flexure, whereby, upon the application of additional loads, as when the vehicle passes over a bump or other unevenness in the road, it may flex to absorb the shock, which is transmitted to it.

The rubber body 12 comprises rubber having a plurality of small interconnected air or gas cells. It may be formed by chemically treating the rubber in such manner that during the curing operation a gas is liberated from the rubber composition to effect a plurality of gas cells extending throughout the mass and separated by thin rubber walls, depicted at 21 in Fig. 3. After the curing operation, the rubber mass may be subjected to great pressure to rupture the cell walls 21, or some of them, either by a mechanical action or by the gas pressure resulting from the compression of the cells due to the great pressure.

It will be understood that the walls of the cells, or some of them, will be ruptured at one or more points to provide cell interconnecting passages 22 which may be more or less closed when the rubber body is in normal unflexed condition. Upon initial compression of the body, these passages may be opened by the compression of fluid within the cells and will permit deflation of the cells, such deflation being resisted by friction of the fluid with the walls of the passages 22. When the rubber has been compressed to a certain degree, the passages 22, or some of them, may be closed by mechanical movement of the passage walls into contact, thereby trapping the remaining fluid within the cells and thus resisting further compression of the body.

Following such compressional movement, the air cells, or some of them, may be more or less completely deflated, and the small cell interconnecting passages may be almost completely closed so that the cushion will not immediately rebound by the resilience of the rubber to effect a catapulting of the passenger from the seat, but will slowly assume its normal position as atmospheric air seeps through the almost closed passages into the cushion air cells. This action, allowing ready compression of the cushion to absorb shocks, by reason of the opening of the passages upon compressional flexure of the cushion, and the slow return of the cushion body to a normal position, by the restriction of the passages and their resistance to the return of air into the cushion, is similar to the action of a vehicle shock absorber in checking or delaying rebound.

The resistance of the rubber body to flexure, and the rate of rebound, will thus be dependent upon a number of conditions, including the size of the cell interconnecting passages or the degree of rupture of the cells, the inherent resilience of the rubber due to its composition, and the size of the cells as compared with the thickness of the cell walls. The degree of flexibility and resilience of the upper and lower portions of the seat cushion may thus be controlled by changing one or more of these conditions, it being, however, one purpose of this invention to so vary the character of the upper and lower portions of the rubber body that the desired degrees of support and cushioning are provided for the passenger.

Figure 3:
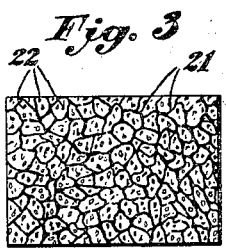
Fig. 3 is an enlarged fragmentary sectional view illustrating, in more or less diagrammatic form, the internal structure of the resilient body of the cushion.

The cell walls 21, as will be seen in Fig. 3, provide substantially continuous webs of rubber extending longitudinally, transversely and diagonally. The diagonal webs function as cross-braces to prevent lateral weaving or horizontal movements of the upper face of the cushion relative to the lower face.

Figure 1:
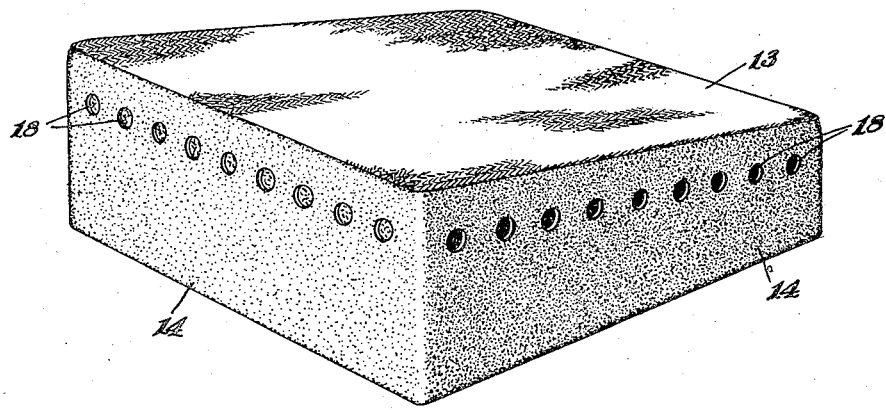
Fig. 1 is a perspective view of a complete seat cushion formed in accordance with the present invention.

As shown in Fig. 1, apertures 18 may be provided in the sidewalls 14 or other portions of the covering material 13, so that the air exhaled from the cushion, upon compression thereof, may readily find its way to the atmosphere, and, upon return of the cushion to its normal position, may serve to admit fresh and cooling air to the cushion interior. While in the illustrated embodiment, it will be noted that the apertures 18 extend completely about the periphery of the cover walls, it will be understood, that, if desired, they may be all formed on one concealed side so that plain wall surfaces only will be presented to view.

It is preferred that the cover 13 be free of the rubber cushion being secured only to the frame. The side wall portions 14 of the cover being unsecured to the rubber body will not be unduly creased or wrinkled upon flexure of the cushion and in order to provide between the walls 14 and the side edges of the body, space for the reception of air exhaled from the rubber body in the event such air may have difficulty in immediately obtaining exit through the apertures 18.

As illustrated, it is preferred that the rubber body of the cushion be of substantially constant depth in order to provide the necessary cushioning effect and adequate support for the passenger over its entire seating surface. As it is desirable to have the seating surface incline downwardly from its forward edge, the frame may be made of greater depth at its front than at its rear sides.

It will be understood that the herein described and illustrated device is merely one typical embodiment of the principles of the invention, and that other devices having different structural characteristics may be devised within the scope of the invention.

What I claim is:

1. A shock absorbing seat for vehicles, comprising a unitary body of sponge rubber having superimposed portions possessing differing shock absorbing characteristics, one sponge rubber portion having definitely greater self-sustaining and load-carrying capacities than the relatively superimposed sponge rubber portion, the latter sponge rubber portion acting to absorb those shocks incidental to vehicular travel, and the first mentioned sponge rubber portion acting to absorb road shocks of intensity in excess to the shock absorbing capacity of the said latter or second mentioned sponge rubber portion.

2. A cushion seat for vehicles, comprising a body of sponge rubber having a layer of sponge rubber having definite self-sustaining and shock absorbing characteristics, and a second layer of sponge rubber superimposed on the first sponge rubber layer and possessing definite shock absorbing characteristics differing from the shock absorbing characteristics of the first layer for absorbing such shocks as are incidental to vehicular travel, said first layer acting to absorb the road shocks and such abnormal shocks during vehicular travel as are too great to be absorbed wholly by said second sponge rubber layer.

ERNEST F. BECHER.